US United States Patent Office 3,175,371
Patented Mar. 30, 1965

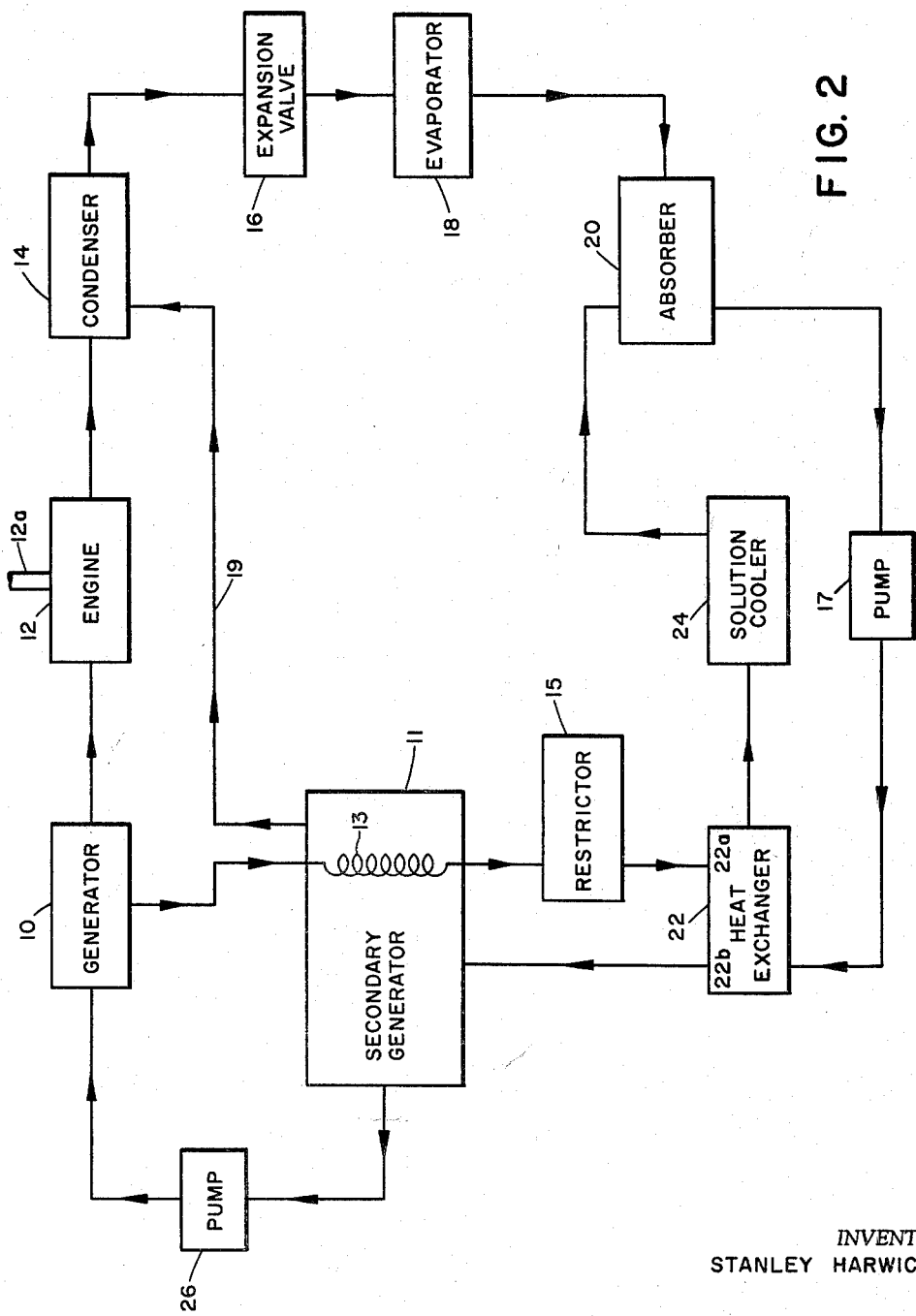

3,175,371
REFRIGERATION PROCESS AND APPARATUS FOR THE SAME
Stanley Harwich, 1471 Carroll St., Brooklyn 13, N.Y.
Original application Nov. 25, 1955, Ser. No. 548,876, now Patent No. 3,041,853, dated July 3, 1962. Divided and this application June 22, 1962, Ser. No. 212,754
4 Claims. (Cl. 62—101)

This invention relates to a new and improved refrigerating process and apparatus for the same, and more particularly as the same applies to high efficiency thermally operated refrigeration systems. This application is a divisional of the application 548,876 filed November 25, 1955, now United States Patent 3,041,853.

In general, the thermally operated refrigeration systems have been of the absorption type, and have been less than moderately successful because of a relatively low co-efficient of performance. A major obstacle, among others, to the widespread use of the absorption type refrigeration system resides in the large quantities of rejected heat, and the requirements for bulky accessory equipment for its disposal, such as condensers, cooling towers, and their associated equipment. The relatively high cost of installation of cooling water recirculation equipment, the large volume of cooling water required, and inefficient operation of the entire system resulting in high specific fuel consumption is a further deterring factor in the acceptance of such systems.

Refrigeration in the field of transportation is relatively important in our daily lives, and much progress has been made toward obtaining satisfactory results. However the absorption type of refrigeration system has failed to gain acceptance in this field because of the unavailability of a suitable economical heat source and a practical cooling medium.

Attempts were heretofore made to utilize compression type systems driven by reciprocating steam engines. This type of operation is now obsolete as a result of its high specific fuel consumption, and the necessity for the additional use of steam auxiliaries such as boilers, condensers, feed pumps, and the like.

The use of a compression refrigeration system driven by a steam turbine has been found to be economical only in the very large size installations. However, here again it is necessary to complement the steam turbine with a complete set of auxiliaries.

The compression system of refrigeration has also been driven by the internal combustion engine. The varied shortcomings of such a system are well known. Extensive vibration, noise, noxious fumes, poor fuel economy, frequent and costly maintenance, and lack of reliability are the predominant nuisances of the aforesaid combination where small motors are utilized. The use of higher horsepower engines of multi-cylinder construction somewhat ameliorates the vibration, reliability, and fuel economy problem, depending on design, but then the initial cost of the equipment becomes excessively high.

It is a prime object of the present invention to provide an improved thermally operated refrigeration system having a comparatively high overall co-efficient of performance.

It is a further object of the invention to provide a thermally operated refrigeration system of improved design and low fuel consumption requirements for given refrigeration conditions.

It is another object of the invention to provide an improved thermally operated refrigeration system, which in operation, has a resultant smaller quantity of rejected heat than comparable systems.

It is a further object of the invention to provide an improved refrigeration system wherin a plurality of refrigeration circuits have inter combination of elements to improve efficiency of operation.

It is another object of the invention to provide improved control means within a plurality of refrigeration circuits for increasing the efficiency of a refrigeration system.

It is a further object of the invention to provide an improvement of my invention as disclosed in a co-pending application, Serial Number 445,603 filed July 26, 1954, now Patent No. 3,015,940, by eliminating excessive heat losses resulting from generator-absorber circulation.

It is another object of the invention to provide an improvement in my invention as disclosed in the co-pending application Serial Number 445,603 by permitting utilization of higher temperatures and pressures in the primary generator, achieving higher thermal efficiency of the system prime mover without thereby incurring excessive heat loss elsewhere in the system.

It is another object of the invention to provide an improved refrigeration system wherein a plurality of generators containing a solution of refrigerant and absorbent operate at a series of temperatures producing mechanical energy by means of appropriately connected prime movers.

It is a further object of the invention to provide an improved refrigeration system which is adaptable to being powered by solar radiation.

It is a further object of the invention to provide an improved thermally operated refrigeration system which is compact in use, and economical to assemble, service and maintain.

Other objects and advantages of the invention will hereinafter be further discussed and will also be apparent to those skilled in the art, and a fuller understanding of the invention will be afforded the reader of the following specification which makes reference to the drawing, wherein:

FIGURE 2 is an alternate illustrative embodiment including the invention.

Figure 1:
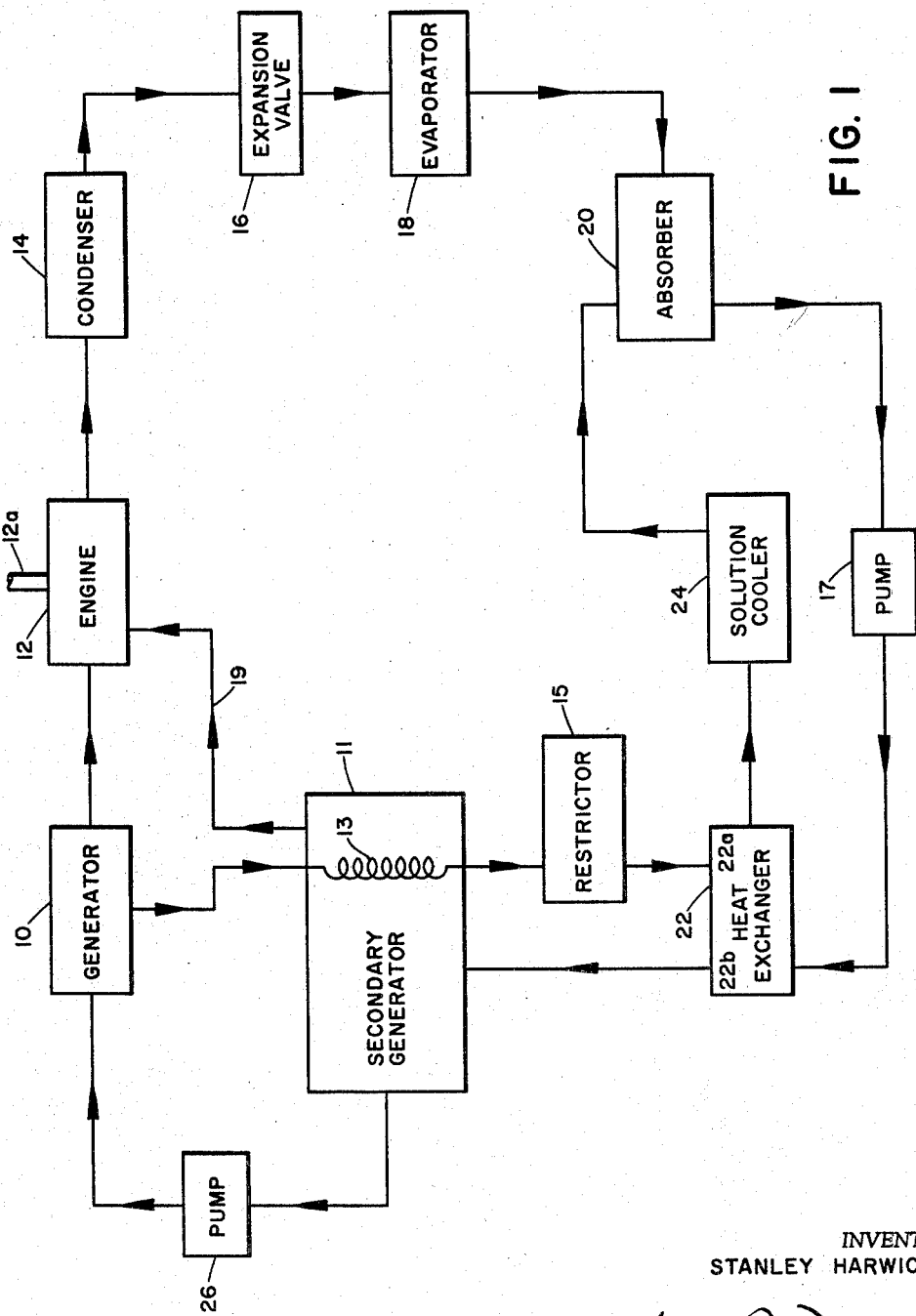
FIGURE 1 is a block diagram of an illustrative refrigeration system including the invention.

Referring to the drawing in detail and more particularly to FIGURE 1, my invention includes an arrangement of component members including a primary generator 10. The high pressure output of primary generator 10 is suitably connected to the input of an engine 12 which may preferably be a unaflow engine of suitable design or multi-stage turbine such as will hereinafter be referred to.

The engine exhaust, at a lower pressure, is further connected to a condenser 14 and the output of said condenser 14 is connected to the input side of an expansion valve 16.

The output side of expansion valve 16 is connected to the input of an evaporator 18 and the output of said evaporator 18 is connected to an absorber 20.

A second network of connections includes a connection between primary generator 10 and a heating coil 13 within a secondary generator 11. The output from heating coil 13 is connected to the input of a first section 22a of a seat exchanger 22 via a restrictor or metering valve 15. The output of said first section of heat exchanger 22 is connected to a solution cooler 24. The output of solution cooler 24 is connected to absorber 20 and the output of absorber 20 is connected to a pump 17 which may be of any suitable type including the variable or fixed displacement type. The output of pump 17 is fed through a second section 22b of heat exchanger 22 into secondary generator 11. Solution from secondary generator 11 is conducted through pump 26 to primary generator 10.

Secondary generator 11, by design, is operated under proper temperature and pressure conditions to provide an output of gaseous refrigerant which is fed from secondary generator 11 via a line 19 to an input portion of prime mover 12.

Prime mover 12 may preferably be of suitable known unaflow design or multi-stage turbine design. In either case although the multi-stage design may, in a suitable manner provide a convenient means for efficient and complete adiabatic expansion of the gaseous refrigerant supplied from primary generator 10 to the temperature and pressure of condenser 14, the multiple stages or multiple cylinder arrangement are proportioned and connected so as to permit the introduction of the gaseous refrigerant output of secondary generator 11 into the prime mover either at a point in the expansion of gaseous refrigerant derived from the primary generator at which its pressure equals the secondary generator pressure or into a prime mover in which individual circuits are provided for the outputs of primary generator 10 and secondary generator 11 respectively, said circuits exhausting in a common condenser 14. Such individual prime mover circuits where used, will yield mechanical energy outputs which may be mechanically interconnected or employed individually as is appropriate in particular applications. Such mechanical energy outputs may be employed as hereinafter described.

It is suggested that the pumps 17 and 26 may be suitably powered by the prime mover of the refrigeration system or in the alternative they may be powered from an external source. In either case, suitable speed, capacity, or displacement regulation coupled to react with the level of the solution in the generators may be provided, this phase being well known in the art.

In particular applications, the capacity of the solution pumps 17 and 26, would be co-ordinated with the design of the balance of the system and particularly with respect to the restrictor or metering valve to achieve optimum efficiency and performance. It is not intended to imply that only one type of pump or metering system may be utilized with the invention, as many types of pumps and metering system are well known in the art and may be employed an dictated by any particular application.

The alternate embodiment illustrated in FIGURE 2 wherein similar numerals are applied to identical elements of the system, comprises a circuit substantially similar to that of FIGURE 1, varying only in the manner in which the gaseous refrigerant output from secondary generator 11 is fed directly to condenser 14 without undergoing an expansion through prime mover 12. In this alternate embodiment it is possible to utilize a unaflow engine or any other engine of a similar type, or a suitable turbine.

At this point I would like to point out that the invention as described in FIGURES 1 and 2 may be utilized to drive a mechanical compression refrigeration system by means of a power takeoff from engine 12 through a shaft 12a.

In operation and referring more specifically to FIGURE 1, my invention functions in the following manner. Heat from any suitable source is applied to primary generator 10. The primary generator 10 has therein a solu- of a non volatile, or relatively non-volatile absorbent, such as lithium bromide, in a liquid refrigerant such as water. When heat is applied to the primary generator from a suitable source, the volatile refrigerant boils and a relatively high gaseous refrigerant pressure as determined by specific design is developed within the generator, the pressure depending upon the temperature, and the refrigerant-absorbent solution concentration. The absorbent is not present in the gaseous phase in any appreciable quantity.

The primary generator 10 is suitably connected to prime mover 12, so that the gaseous refrigerant is conducted to the prime mover, in which it undergoes an essentially adiabatic expansion form the generator temperature and pressure to the prevailing condenser 14 temperature and pressure.

The prime mover exhaust is connected to the aforesaid condenser 14, where the refrigerant exhausted by the prime mover is condensed from the gaseous to the liquid phase, at the there available heat rejection temperature, with the liberation of its latent heat of vaporization, which is conducted away by a suitable cooling medium.

The liquid refrigerant from the condenser 14 proceeds through expansion valve 16 to evaporator 18, undergoing a throttling process from the condenser pressure to the evaporator pressure, and a consequent decrease in temperature to the evaporator temperature. The liquid refrigerant in the evaporator evaporates, absorbing its latent heat of vaporization from the surrounding area to be refrigerated.

The output of said evaporator 18 is connected to absorber 20. A concentrated or strong solution of refrigerant and absorbent is maintained in absorber 20 at the temperature of the thereat available heat rejection medium by a connection with the primary generator 10 through coil 13 and restrictor 15, heat exchanger 22 and solution cooler 24. Since the vapor pressure of the solution in absorber 20 corresponds to the saturation vapor pressure of the refrigerant at the low evaporator temperature, any increase in evaporator temperature results in boiling of the refrigerant in the evaporator 18, and absorption of the evolved gaseous refrigerant by the solution in absorber 20, maintaining the low evaporator temperature and pressure, and providing means of returning the refrigerant to the primary generator 10 through pump 17, heat exchanger 22, secondary generator 11, and pump 26, for completion of the closed cycle.

Absorber 20 is connected to the primary generator 10, by a solution circulation system hereinbefore described. In operation, weak solution pumped from absorber 20 by pump 17 flows through heat exchanger 22, where it is heated by a stream of strong solution bound for the absorber via the heating coil 13. The heated solution is then fed to secondary generator 11.

The secondary generator solution, intermediate in strength between that of weak solution leaving absorber 20 and that of primary generator 10, then flows into primary generator 10 via pump 26.

The gaseous refrigerant from secondary generator 11 is conducted to prime mover 12 wherein the gaseous refrigerant is utilized concomitantly with the output from generator 10 to drive the prime mover 12 in such manner as to operate through either separate or a selectively comingled multiplicity of stages and thus obtain with great efficiency a maximum of power output.

Gaseous refrigerant from secondary generator 11 may be conducted to a prime mover having separate flow paths for its working substance in such manner as to feed said gaseous refrigerant to one of said flow paths and the gaseous refrigerant from the primary generator 10 to a second of said flow paths, the resultant derived mechanical energy being taken off a single shaft for the combined output or independent shafts for each output. From the foregoing it is obvious that I intend the flow paths to be of suitable design for the pressures, temperatures and volumes obtainable from the primary and secondary generators.

Gaseous refrigerant from secondary generator 11 may be conducted to a prime mover having combined flow paths for its working substance in such manner as to merge said gaseous refrigerant from secondary generator 11 with gaseous refrigerant traversing the prime mover from primary generator 10 to condenser 14 at that point in its expansion at which its pressure, and that of the gaseous refrigerant entering prime mover 12 from secondary generator 11 are substantially equal. From the foregoing it is again obvious that I intend the flow paths to be of suitable design for the pressures, temperatures and volumes obtainable from the primary and secondary generators.

The exhaust from the prime mover is fed to the condenser and through the cycle in a manner elsewhere described.

In the embodiment illustrated in FIGURE 2, the cycle is substantially similar, varying in that the gaseous refrigerant from secondary generator 11 is fed directly to the condenser 14.

It is evident that sufficiently high primary generator temperatures and pressures will warrant the use of additional "secondary" generators, each with its associated heating coil and pump, and each supplying gaseous refrigerant output to its associated appropriate expansion stage of the prime mover or in the case of a low temperature and pressure "secondary" generator, to the condenser, as outlined above, in order to achieve the greatest possible utility from the system heat input. In such an embodiment, strong solution leaving the primary generator would traverse the heating coil of each "secondary" generator sequentially before continuing its path toward the absorber as hereinbefore described. Weak solution bound from the absorber toward the primary generator would enter each "secondary" generator sequentially, being pumped to each sequentially higher pressure level in each respective "secondary" generator by its associated solution pump.

While under certain design considerations heat input to the system will ordinarily be furnished to the primary generator only, a sequential application of other heating medium such as flue gases to the secondary generator or generators in orders of decreasing temperatures will provide a further improvement in the efficiency of the system where desirable.

Where the mechanical output of prime mover 12 is employed to drive a mechanical compression refrigeration system, the thermal cooling medium flow, and heat rejection medium flow inter-relationships of the various respective refrigeration system components may be arranged as contemplated by my co-pending application, Serial No. 445,603.

Having described the invention in detail, I desire to point out the following advantages of the invention in particular applications.

My invention is ideally suited to operate on heat such as is rejected from gas turbines, internal combustion machines or engines, or industrial processes, and more particularly where such sources do not supply sufficient heat for obtaining the required refrigeration when utilizing the heretofore known systems. It may likewise be operated on the ordinary fuels utilized for furnishing heat, showing great economy over previous methods and means for performing the same task.

The high efficiency of my invention lends this system to application of solar heat and power for refrigeration and air conditioning. Its application as a reverse cycle heat pump also finds utility in not too severe climates where fuel is expensive, or cooling equipment is utilized and fitted with means of reversing the cycle.

The invention permits the use of power obtained from the system for operating mechanical auxiliary units.

It is to be borne in mind that minor details in connection with operation of the invention such as purging of the system are contemplated and have not been discussed in detail because they are obvious to those skilled in the art.

Further variations from the specific embodiments utilized to describe my invention will present themselves to those skilled in the art, and I desire that the claims herein be given as broad an interpretation as is consistent with the spirit and scope of my invention.

What is claimed is:

1. In a refrigeration system of an absorption type including a first generator containing a refrigerant absorbent solution, a second generator having a first section and a second section in heat exchange relationship, a prime mover, a condenser, an evaporator and an absorber; a first circuit comprising means for delivering a gaseous refrigerant from said first generator through said prime mover to said condenser wherein said gaseous refrigerant is liquified, means for causing said liquified refrigerant to be delivered to said evaporator wherein said liquified refrigerant is evaporated, means for delivering said evaporated refrigerant to said absorber wherein said evaporated refrigerant is absorbed within a strong refrigerant-absorbent solution; means for delivering said refrigerant absorbent solution to the first section of said second generator wherein a gaseous refrigerant is to be generated; and a second circuit comprising means for delivering a strong refrigerant-absorbent solution from said first generator to said absorber through said second section of said second generator; and further means for conducting a gaseous refrigerant from said first section of said second generator to said condenser, and means for delivering said refrigerant-absorbent solution less said gaseous refrigerant to said first generator.

2. The process of refrigeration comprising the heating of a refrigerant absorbent solution in a first generator and vaporizing said refrigerant, expanding said vaporized refrigerant through a prime mover, deriving mechanical power therefrom, condensing said refrigerant in a condenser, evaporating said refrigerant under reduced pressure in an evaporator, absorbing said refrigerant in a strong refrigerant-absorbent solution in an absorber, heating the refrigerant-absorbent solution from said absorber in a second generator to generate a gaseous refrigerant, transferring said gaseous refrigerant directly from said second generator to said condenser, returning the residual refrigerant-absorbent solution from said second generator to said first generator and condensing said gaseous refrigerant from said second generator in said condenser.

3. The process of refrigeration comprising the heating of a refrigerant absorbent solution in a first generator and vaporizing said refrigerant, expanding said vaporized refrigerant through a prime mover, condensing said refrigerant in a condenser, evaporating said refrigerant under reduced pressure in an evaporator, absorbing said refrigerant in a strong refrigerant-absorbent solution in an absorber, heating of the refrigerant absorbent solution from said absorber in a second generator by means of the heated refrigerant-absorbent solution efferent from said first generator to generate a gaseous refrigerant, transferring said gaseous refrigerant directly from said second generator to said condenser, returning the residual refrigerant-absorbent solution from said second generator to said first generator, and condensing said gaseous refrigerant from said second generator in said condenser.

4. The process of refrigeration comprising the heating of a refrigerant absorbent solution in a first generator and vaporizing said refrigerant, expanding said vaporized refrigerant through a prime mover, condensing said refrigerant in a condenser, evaporating said refrigerant under reduced pressure in an evaporator, absorbing said refrigerant in a strong refrigerant-absorbent solution in an absorber, heating of the refrigerant absorbent solution from said absorber in a second generator by means of the heated refrigerant-absorbent solution efferent from said first generator to generate a gaseous refrigerant, returning the residual refrigerant-absorbent solution from said second generator to said first generator, transferring said gaseous refrigerant directly from said second generator to said condenser, condensing said gaseous refrigerant from said second generator in said condenser, and reducing the temperature of said refrigerant absorbent solution utilized to heat the refrigerant absorbent solution in said second generator and passing said cooled refrigerant absorbent solution to the absorber.

References Cited in the file of this patent

UNITED STATES PATENTS

| | | |
|---|---|---|
| 1,788,114 | Liljenroth | Jan. 6, 1931 |
| 2,693,090 | Kogel | Nov. 2, 1954 |
| 2,795,115 | Kumm | June 11, 1957 |